Figure 1:
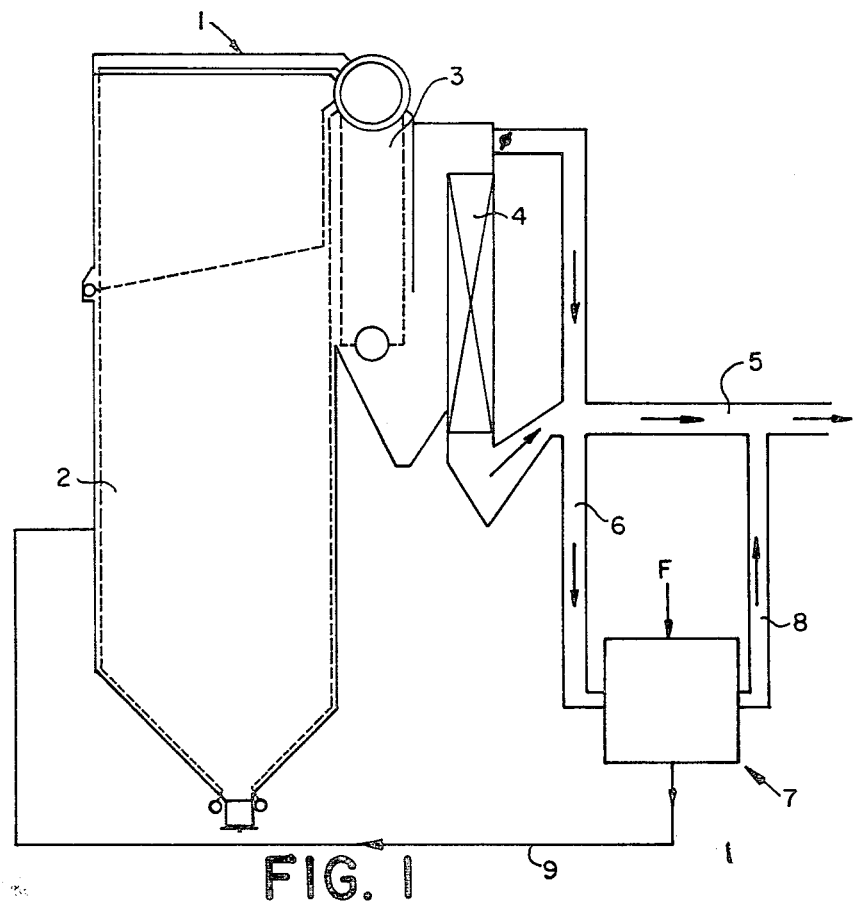

United States Patent [19]

Eneroth et al.

[11] 4,229,183

[45] Oct. 21, 1980

[54] METHOD OF REFINING SOLID FUEL OF ORGANIC VEGETABLE MATERIAL

[75] Inventors: Jan-Mats Eneroth; Sven A. Nordfeldt, both of Vaxjo, Sweden

[73] Assignee: AB Svenska Flaktfabriken, Stockholm, Sweden

[21] Appl. No.: 25,551

[22] Filed: Mar. 30, 1979

[30] Foreign Application Priority Data

Apr. 4, 1978 [SE] Sweden ................................. 7803776

[51] Int. Cl.³ ........................... C10L 5/44; C10F 7/02
[52] U.S. Cl. ....................................... 44/1 D; 44/1 E; 44/10 A; 44/10 B; 44/31; 44/32
[58] Field of Search ............ 44/1 D, 1 E, 10 A, 10 B, 44/31, 32, 33

[56] References Cited

U.S. PATENT DOCUMENTS

| | | | |
|---|---|---|---|
| 1,870,522 | 8/1932 | Maurel | 44/10 B |
| 3,064,592 | 11/1962 | Eberhardt | 44/1 E |

OTHER PUBLICATIONS

Bark Pelleting . . . A New Solution to an Old Problem, Anonymous, Better Fibers, 1961, Sprout, Waldron & Co., Inc., Muncy, Pa., 3 pages.

*Primary Examiner*—Carl F. Dees
*Attorney, Agent, or Firm*—Dann, Dorfman, Herrell and Skillman

[57] ABSTRACT

A method for refining organic material such as bark, wood shavings, wood chips, other wood waste and peat for use as a solid fuel or for gas generation in which the material after dewatering is disintegrated and dried by the flue gases passing from the heat exchange surfaces of the furnace in which the material is burned.

13 Claims, 2 Drawing Figures

METHOD OF REFINING SOLID FUEL OF ORGANIC VEGETABLE MATERIAL

This invention relates to a method of refining solid fuel, such as bark and other wood waste, shavings, chips, peat or other organic material.

Solid fuel of the aforesaid type is available in great quantities in Sweden. As an example can be mentioned that the amount of bark, for example, at pulp mills and sawmills is $2 \times 10^9$ kg. dry substance/year. The other fuel types listed above, and especially peat, are also available in large quantities. It can be stated, however, that none of these fuel types is utilized to any great extent for the production of energy, when compared with energy production from imported energy fuel types, which primarily refers to oil. The main reason for this is that no efficient method had been found for processing and combusting the fuels in such a manner, that a good overall economy was obtained, which means that the methods used heretofore have required too high investment and have been too expensive in operation in relation to the recovered energy. At present, already a great part of the bark is used as fuel, because it was necessary to find a solution to the problem of how to handle the large bark quantities obtained. Decomposition is not recommended from an environment aspect, and alternative fields of application have only marginal importance. In the following, mainly the technique of bark burning will be dealt with, which is most developed, but the teachings in most respects can be applied also to the technique of processing and combusting other solid fuels.

Bark has a relatively low calorific value, especially at a high moisture content, compared with oil and coal. The calorific value at 75% moisture content is 11,200 kJ/kg dry substance, while at a moisture content of 15% the calorific value amounts to 18,800 kJ/kg dry substance. It further can be stated that the entire annual production of bark in Sweden at a moisture content of 60%, as regards energy content, corresponds to 750,000 tons of fuel oil. When stripped or otherwise harvested, the bark has a moisture content of above 60%, which implies difficulties in controlling the combustion process. Therefore, the moisture content of bark normally is lowered prior to the combustion. This lowering is carried out by shredding and pressing the moist bark. After having been pressed, the bark has a moisture content of about 60%. For combustion, the bark must be dried. The most usual method is to dry the bark in a firebox and to use as drying medium part of the flue gases or hot air developing from the combustion of the bark. The calorific value of the bark hereby is increased while sacrificing energy for the drying.

Heretofore, bark has been combusted mainly in two types of boilers, either in boilers with inclined grate or in cyclone furnaces. Bark is ignited first when it achieves about 90% dry content and, as is understood easily, a great portion of the grate surface therefore is used for drying the bark. As a result thereof, in combination with the fact that the drying process in the firebox produces large amounts of flue gas and a low combustion temperature, the heat exchange surfaces of the boiler and its dimensions in general must be designed relatively large, compared with the design of the boiler if the fuel were dry. The investment costs, consequently, are high. It has, therefore, not been possible so far to produce energy by using bark as fuel, in a way competitive with energy production from oil, for example.

The present invention has the object to teach a method of refining solid fuel of the aforesaid type. This object is achieved due to the characterizing features defined in the attached claim 1 and subsequent subclaims.

Figure 2:
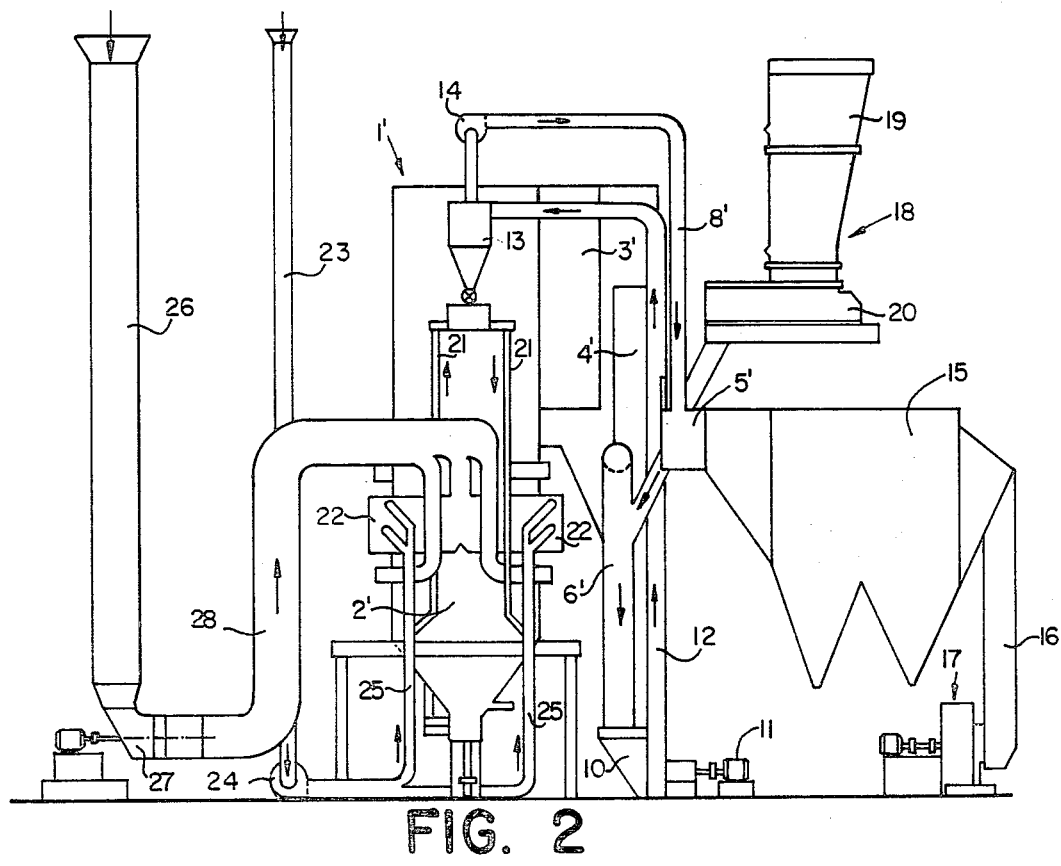

The invention is described in greater detail in the following, with reference to the accompanying drawings, in which:

FIG. 1 shows in a schematic manner an installation where the invention is applied in connection with a steam boiler; and FIG. 2 shows in a schematic manner and in greater detail an installation where the invention also is applied in connection with a steam boilder.

In FIG. 1, the numeral 1 designates a steam boiler of conventional type, comprising a firebox 2, a convection surface for steam production 3 and after-heating surfaces 4 (economizer and air-preheater).

The fuel is supplied, together with combustion air, to the firebox 2. The flue gases pass the heat exchange surfaces 4 and are conducted away through the flue gas passageway 5. According to the invention, an adjusted amount of flue gases is passed via the passageway 6 to a processing unit 7 where the solid fuel is refined and separated from the flue gases, which then are led off to the passageway 5 via the passageway 8. The refined fuel is supplied to the processing unit, as indicated schematically in FIG. 1 by an arrow F, and after processing discharged via a transport conduit 9 to the firebox 2 of the boiler, where the refined material is combusted. In said processing unit 7, the material is disintegrated into finely distributed state and dried by flue gases, which then are separated from the material. In FIG. 1, the processed material is supplied directly to the boiler for combustion, but it also is possible to transport the material or a part thereof to a pelletizing plant for the production of pellets. This latter method is particularly suitable in cases when the fuel is to be stored before its combustion, because the material in the form of pellets is easier to handle than in powder state. Pelletization, furthermore, has the effect that the material is less sensitive to moisture and dampness, because its moisture absorption capacity has been decreased. When the material after processing is supplied directly to the firebox of the boiler for combustion, powder firing is applied. This material after having been processed has a high dry content and, therefore, the flue gas amount through the boiler is smaller, due to the lower content of water vapour in the flue gases. Hereby also the combustion temperature is increased, whereby the temperature difference between flue gases and water in the boiler is improved, so that the heat exchange surfaces of the latter can be designed smaller. The entire boiler can be designed with smaller dimensions, compared with conventional firing of, for example, bark. This implies an improvement of the overall economy of the installation in its entirety.

The invention and its advantages are described in greater detail with reference to FIG. 2, which shows in detail an application of the invention. The numeral 1' designates a steam boiler provided with a firebox 2' and heat-absorbing surfaces 3' and 4'. The latter flue gases are conducted away through a passageway to flue gas filter, while an adjusted part of the gases is directed via the passageway 6' to a mill 10, where the fuel is disintegrated while being exposed to the effect of the gases, so that the material during its disintegration is dried simultaneously. This process usually is called mill-drying. The greatest part of the energy supplied to the mill for the bearing work can be recovered as heat for the drying process. In the mill which is driven by a motor 11, the material is atomized to powder or a similar state, depending on the material being processed. During the beating operation, an intense contact of the flue gases with the material being processed is established, whereby the material is dried effectively.

After the mill, the atomized material is transported pneumatically, by using the flue gases as transport medium, through the passageway 12 to a cyclone separator 13 where the drying gas and the material are separated in known manner. The passageway 12 is designed so as to serve as a pneumatic drying step, i.e. the material is dried pneumatically while being transported. After the cyclone separator, the gas is passed by a drier-fan 14 through the passageway 8' to the flue gas passageway 5' from the boiler. The total flue gas flow is cleaned in a dust-separator in known manner, for example in an electrostatic dust separator 15. The cleaned gas is conducted away through the passageway 16 by means of the fan unit 17.

The fuel to be processed is supplied to the installation through a feed device 18, which comprises a storage container 19 and feed means 20. When the fuel consists of very moist bark, the bark has been subjected to a de-watering pretreatment, preferably consisting of disintegration and pressing. The dry content after the pretreatment is about 40%. The material is supplied from the feed device to the mill via the passageway 6' as described above. After the cyclone separator 13, the atomized and dried fuel is passed through the conduits 21 and 25 to the firebox 2' of the boiler, where the fuel is combusted by means of powder burners 22. It should be mentioned, however, that in certain cases the fuel suitably should be dried in several drying steps, where the fuel is passed to one or more additional pneumatic drying steps with intermediate cyclone separators. The primary air is taken in through the passageway 23 by means of the fan 24 and supplied to the burners together with the fuel via the passageways 25. Necessary secondary air is taken in through the passageway 26 by means of the fan 27 and distributed to the different burners through the passageway 28. Due to the high dry content of the fuel, the flue gas volume is minimized, and the combustion temperature is relatively high, so that the heat exchange surfaces of the boiler can be reduced in size and be subjected to a higher load. This is advantageous from an investment aspect as well as with respect to the boiler capacity. The flue gases used for drying the fuel are removed after, and part of them before, the after-heating surfaces of the boiler and mixed to a condition suitable for the drying. The drying gas, thus, consists of an inert gas, which is essential in view of the fire and explosion risk. A high temperature of the drying gas, for example 300°-400° C., can be chosen and yet the drying proceeds at such a low material temperature that degassing of the material is prevented. In spite thereof, a high dry content of the material is obtained, and the final dry content can easily be adjusted. Suitable values of the final dry content are 70-90%. The processing method described shows the advantage, that the drying process of the fuel takes place in a separate processing step, which implies that the boiler can be operated independently of whether or not material is being processed. In such a case, all flue gases pass directly through the passageway 5 to the electrostatic precipitator 15. At the processing method according to the invention, it is further possible to mix different fuel types. The fuel, for example, may be bark and other wood waste, shavings, chips, peat or other organic material. This possibility is very essential, because owing to it fuel can be recovered which as such alone could not be utilized, but which together with one or more other fuel types now can be refined in an effective way to a fuel of higher value which, besides, is easy to handle.

In the installation shown in FIG. 2, the processed fuel is supplied to the boiler and combusted by powder firing. As already mentioned, it is also possible to further process the fuel by forming it into pellets or briquets whereafter it can be combusted, possibly after storage, also in conventional boilers with grate-firing. Another field of application for the fuel is to use it for gas generation in a gas generator.

The invention, conclusively, provides a method of recovering fuel and refining it to a form rendering possible its combustion in an installation with good overall economy for the entire processing operation, which has not been possible heretofore with fuels such as bark and other wood waste, shavings, chips, peat or other organic material.

We claim:

1. A method of refining solid fuel of organic vegetable material, which fuel is dried with utilization of drying gases, characterized in that the fuel is supplied to a mill together with an adjusted amount of drying gases, in which mill the material is disintegrated to finely distributed state and dried simultaneously with said disintegration, whereafter the dried disintegrated material is transported pneumatically by the drying gas from said mill and is further dried in at least one pneumatic drying step, and the material thereafter is separated from the drying gas to produce refined solid fuel.

2. A method as defined in claim 1, characterized in that the fuel consists of bark, which has been dewatered by pressing.

3. A method as defined in claim 1, characterized in that the fuel consists of a mixture of one or more of bark, wood shavings, wood chips, other wood waste and peat.

4. A method as defined in claim 1, characterized in that the drying gas consists of inert waste gases.

5. A method as defined in claim 1, characterized in that the drying gas is taken from the pre-heating and after-heating surfaces of a firebox, so that a condition suitable for the drying is obtained.

6. A method as defined in claim 1, characterized in that the material is dried to a final dry content of between 70 and 90%.

7. A method as defined in claim 1, including the step of combusting the separated refined fuel and characterized in that the said drying gas consists of flue gases from the combustion of the refined fuel.

8. A method as defined in claim 1, characterized in that the material is finely disintegrated in said mill to produce refined fuel in a powder state.

9. A method as defined in claim 8, characterized in that the refined fuel is combusted by powder-firing.

10. A method as defined in claim 1, characterized in that the material is pelletized after refining.

11. A method as defined in claim 1, characterized in that the material is formed to briquets after refining.

12. A method as defined in claim 1, characterized in that the refined fuel is conveyed to gas generation where it is used for gas generation.

13. A method as defined in claim 1, characterized in that the drying gas separated from the material is cleaned in a dust separator before it is discharged into the atmosphere.

* * * * *